United States Patent
Tang

(10) Patent No.: US 9,348,162 B2
(45) Date of Patent: May 24, 2016

(54) LIQUID CRYSTAL DISPLAY AND NARROW BEZEL STRUCTURE THEREOF

(71) Applicant: Shenzhen China Star Optoelectronics Technology Co., Ltd., Shenzhen, Guangdong (CN)

(72) Inventor: Guofu Tang, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 211 days.

(21) Appl. No.: 13/980,047

(22) PCT Filed: Jun. 24, 2013

(86) PCT No.: PCT/CN2013/077787
§ 371 (c)(1),
(2) Date: Jul. 16, 2013

(87) PCT Pub. No.: WO2014/180027
PCT Pub. Date: Nov. 13, 2014

(65) Prior Publication Data
US 2014/0327855 A1 Nov. 6, 2014

(30) Foreign Application Priority Data
May 6, 2013 (CN) .................... 2013 1 0162947

(51) Int. Cl.
G02F 1/1333 (2006.01)
G02F 1/1335 (2006.01)

(52) U.S. Cl.
CPC .... *G02F 1/133308* (2013.01); *G02F 1/133608* (2013.01); *G02F 2001/13332* (2013.01); *G02F 2001/133314* (2013.01)

(58) Field of Classification Search
CPC ................... G02F 1/133308; G02F 1/133608
See application file for complete search history.

(56) References Cited

U.S. PATENT DOCUMENTS

2013/0278858 A1* 10/2013 Hashimoto ....... G02F 1/133512
349/58

FOREIGN PATENT DOCUMENTS

| CN | 102236184 A | 11/2011 |
|---|---|---|
| CN | 102929014 A | 2/2013 |

* cited by examiner

*Primary Examiner* — Phu Vu
(74) *Attorney, Agent, or Firm* — Andrew C. Cheng

(57) ABSTRACT

A narrow bezel structure of a LCD is disclosed. The narrow bezel structure of the LCD comprises a liquid crystal module, a front cover, a middle cover, and a back cover. An external layer of the liquid crystal module is a polarizer film, and the polarizer film is spaced apart from an edge of the liquid crystal module to form a step. The front cover comprises a first horizontal part, a first perpendicular part, a second horizontal part, and a second perpendicular part that are integrally formed and sequentially connected. The first horizontal part is attached to the step. The second horizontal part and the second perpendicular part form a second step. The second perpendicular part is fixedly connected to the back cover. The present invention further provides a LCD utilizing the narrow bezel structure.

14 Claims, 4 Drawing Sheets

LIQUID CRYSTAL DISPLAY AND NARROW BEZEL STRUCTURE THEREOF

BACKGROUND OF THE INVENTION

1. Field of the Invention

The present invention relates to a liquid crystal display (LCD) technology, more particularly, to a narrow bezel LCD.

2. Description of the Related Art

The basic structure of a prior art LCD is as shown in FIG. 1. A front cover 1 is mainly used for pressing a liquid crystal module 2 so as to prevent the liquid crystal module 2 from separating. With the development of display technology, a width 4 of the front cover 1, which is the width 4 of the front cover 1 on the same lateral side as the liquid crystal module 2, becomes smaller and smaller. However, the front cover 1 must have a certain thickness to maintain its rigidity. Such a thickness is typically between 0.4 and 1 mm. The visual appearance is that the front cover 1 protrudes from a display surface S1 of the liquid crystal module 2 to negatively influence the aesthetic feeling of appearance.

The trend of the liquid crystal display module (LCD module) is to narrow down the front cover 1 as much as possible. Even more, a LCD module without the front cover 1 has come out, and the typical practice to achieve the overall appearance is adapting a trimmed shell. Please refer to FIG. 1 for a side cover 3, various brand marketers differentiate their designs by focusing on altering the appearance of the side cover 3. Hence the overall design idea still lies in the side cover 3, and the prior art ultra-narrow bezel LCD module can not satisfy the demand for a variety of overall appearances.

SUMMARY OF THE INVENTION

The present invention provides a narrow bezel structure of a LCD to resolve the above-mentioned problems.

The present invention provides a narrow bezel structure of a LCD, the narrow bezel structure of the LCD comprises a liquid crystal module, a front cover, a middle cover, and a back cover. An external layer of the liquid crystal module is a polarizer film, and the polarizer film is spaced apart from an edge of the liquid crystal module to form a step. The front cover comprises a first horizontal part, a first perpendicular part, a second horizontal part, and a second perpendicular part that are integrally formed and sequentially connected. The first horizontal part is attached to the step. The second horizontal part and the second perpendicular part form a second step. The second perpendicular part is fixedly connected to the back cover.

Preferably, a bottom of the first horizontal part is stuck to the liquid crystal module through a double-sided tape, and one end of the first horizontal part and one end of the polarizer film are butt jointed.

Preferably, the one end of the first horizontal part and the one end of the polarizer film are butt jointed outside the view area of the liquid crystal module.

Preferably, a thickness of the front cover is between 0.2 mm and 0.3 mm.

Preferably, the front cover is made of sheet metal

Preferably, the narrow bezel structure further comprises an outer side cover attached to the second step.

Preferably, an outer surface of the outer side cover and the first perpendicular part are on the same plane.

Preferably, the second perpendicular part is fixedly connected to the back cover by way of snap connection or by way of screw tightening.

Preferably, the narrow bezel structure further comprises a number of locking members being used for holding the liquid crystal module, the locking member comprising a horizontal part and a perpendicular part perpendicularly connected to the horizontal part. The horizontal part presses an upper surface of a bottom glass substrate in an outer lead bonding area of the liquid crystal module, and the perpendicular part and the middle cover are connected by a snap-fit assembly or a screw correspondingly disposed on the perpendicular part and the middle cover.

Preferably, the snap-fit assembly comprises an undercut disposed in the perpendicular part of the locking member and a protrusion portion disposed on the middle cover, and an upper portion of the protrusion portion corresponding to the snapping direction of the perpendicular part is shaped in a slope.

The present invention further provides a LCD. The LCD comprises a liquid crystal module and a backlight module, a front cover, a middle cover, and a back cover. The LCD further comprises a narrow bezel structure of the LCD. The narrow bezel structure of the LCD comprises the liquid crystal module, the front cover, the middle cover, and the back cover. An external layer of the liquid crystal module is a polarizer film. The polarizer film is spaced apart from an edge of the liquid crystal module to form a step. The front cover comprises a first horizontal part, a first perpendicular part, a second horizontal part, and a second perpendicular part which are integrally formed and sequentially connected. The first horizontal part is attached to the step. The second horizontal part and the second perpendicular part form a second step. The second perpendicular part is fixedly connected to the back cover.

Preferably, a bottom of the first horizontal part is stuck to the liquid crystal module through a double-sided tape, and one end of the first horizontal part and one end of the polarizer film are butt jointed.

Preferably, one end of the first horizontal part and the one end of the polarizer film are butt jointed outside the view area of the liquid crystal module.

Preferably, a thickness of the front cover is between 0.2 mm and 0.3 mm.

Preferably, the narrow bezel structure further comprises an outer side cover attached to the second step.

Preferably, an outer surface of the outer side cover and the first perpendicular part are on the same plane.

Preferably, the second perpendicular part is fixedly connected to the back cover by way of snap connection.

Preferably, the second perpendicular part is fixedly connected to the back cover by way of screw tightening.

In contrast to the prior art, the present invention provides a LCD having an improved front cover structure that is cleverly butt jointed to the polarizer film. Hence, the visual effect of no front cover is achieved. Moreover, the added outer side cover further maintains the close attachment of the front cover to the liquid crystal module. Or, locking members are utilized to fix the liquid crystal module so as to guarantee the LCD is installed firmly and safely.

DESCRIPTION OF THE EMBODIMENTS

The present invention is described in detail in conjunction with the accompanying drawings and embodiments.

Embodiment 1

Figure 1:
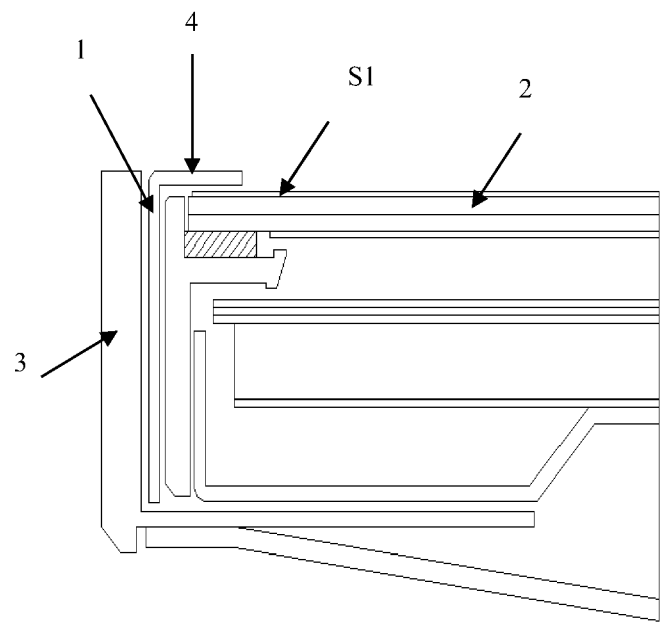
FIG. 1 is a partial schematic diagram showing a structure of a LCD according to the prior art.
Figure 2:
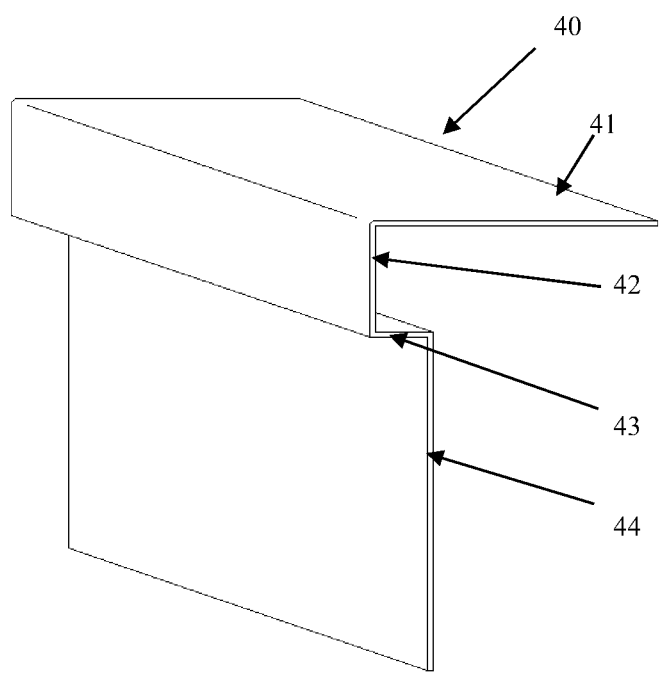
FIG. 2 is a schematic diagram showing structure of a front cover according to an embodiment of the present invention.
Figure 3:
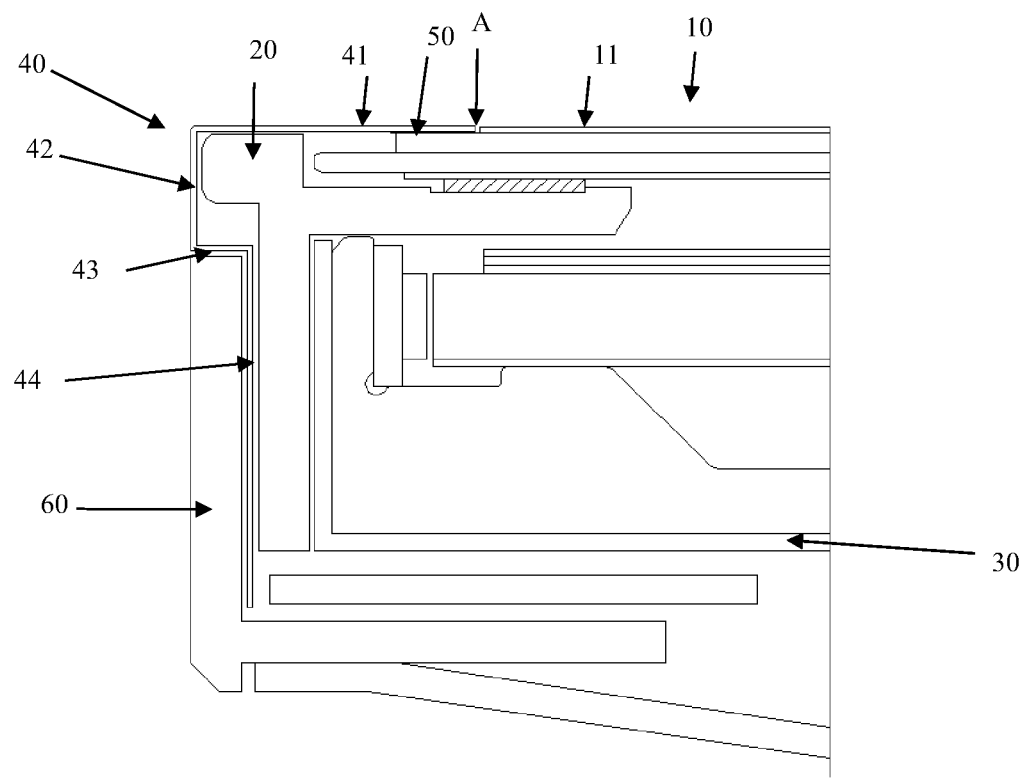
FIG. 3 is a partial schematic diagram showing a structure of a narrow bezel of a LCD according to the first embodiment of the present invention.
Figure 4:
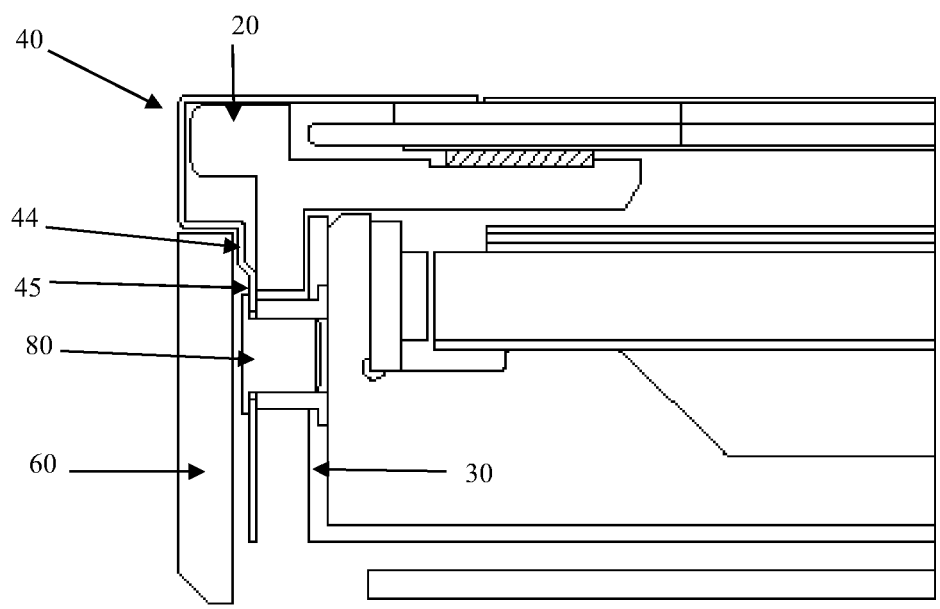
FIG. 4 is a schematic diagram showing a connection structure between the front cover and a back cover according to the first embodiment of the present invention.

As shown in FIG. 2 and FIG. 3, a narrow bezel structure of a LCD comprises a liquid crystal module 10, a middle cover 20, a back cover 30, and a front cover 40. An external layer of the liquid crystal module 10 is a polarizer film 11 and the polarizer film 11 is spaced apart from an edge of the liquid crystal module 10 to form a step. The present invention differs from the prior art in that the front cover 40 comprises a first horizontal part 41, a first perpendicular part 42, a second horizontal part 43, and a second perpendicular part 44 which are integrally formed and sequentially connected. The first horizontal part 41 is attached to the step. The second horizontal part 43 and the second perpendicular part 44 form a second step, and the second perpendicular part 44 is fixedly connected to the back cover 30. Please refer to FIG. 2, a bottom of the first horizontal part 41 is stuck to the liquid crystal module 10 through a double-sided tape 50. One end of the first horizontal part 41 and one end of the polarizer film 11 are butt jointed at point A. In addition, point A where the first horizontal part 41 and the polarizer film 11 butt joint is located outside the view area of the liquid crystal module to avoid light leakage. In order to have better surface planeness of the display panel and highlight the effects caused by eliminating the protruding front cover, a thickness of the front cover 40 is equivalent to a thickness of the polarizer film 11, that is, between 0.2 mm and 0.3 mm. The front cover 40 is made of ultra-thin sheet metal. Moreover, In order to prevent the warping of the first horizontal part 41 due to the poor adhesion between the first horizontal part 41 and the liquid crystal module 10, an outer side cover 60 is disposed and attached to the second step. Namely, two faces of the outer side cover 60 are attached to the second horizontal part 43 and the second perpendicular part 44 so as to enhance the attachment of the first horizontal part 41 to the liquid crystal module 10. In order to uniform the overall appearance of the display, as shown in FIG. 3, the outer surface of the outer side cover 60 and the first perpendicular part 42 are on the same plane. The second perpendicular part 44 may be fixedly connected to the back cover 30 by way of screw tightening. Please refer to FIG. 4, a mounting hole is disposed in the second perpendicular part 44 and the corresponding part in the back cover 30. An internal thread is disposed on the inside of the mounting hole in the back cover 30 to allow a screw 80 to connect the second perpendicular part 44 and the back cover 30. In order to guarantee good attachment between the outer side cover 60 and the second perpendicular part 44, an indented step structure 45 corresponding to the mounting hole may be disposed. Under the circumstances, an inner side of the step structure 45 (on the right of the figure) in the second perpendicular part 44 is attached to the middle cover 20. Correspondingly, an outer side of the step structure (on the left of the figure) is attached to the nut. Of course, a snap connection may be utilized instead of screw tightening. For example, a protruding fixture block may be fixed on the inner side of the second perpendicular part 44, and undercuts are correspondingly formed in the middle cover 20 and the back cover 30.

According to the present embodiment, the front cover 40 is still utilized. But however, the design cleverly integrates the front cover 40 with the liquid crystal module 10 to achieve the visual effect of no front cover 40.

Embodiment 2

Figure 5:
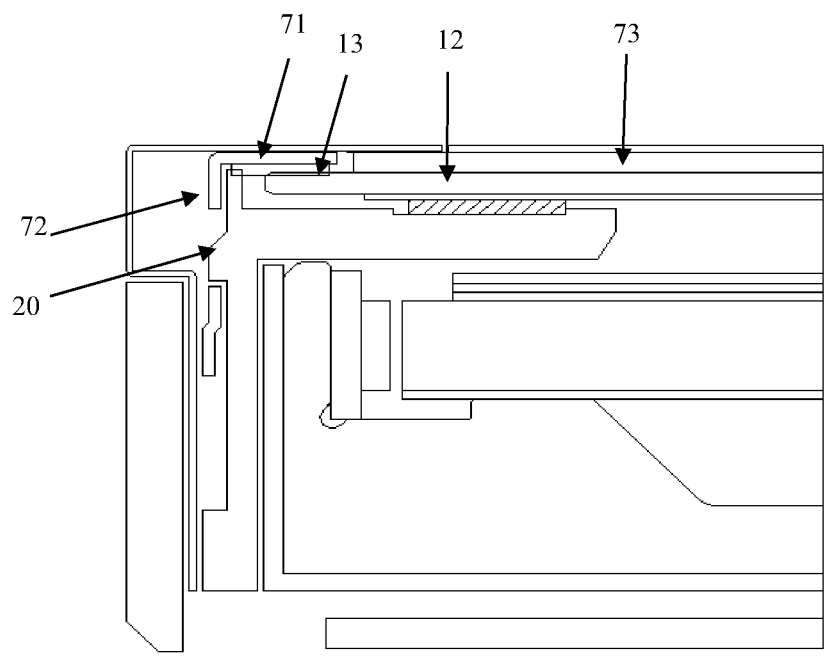
FIG. 5 is a partial schematic diagram showing a structure of a narrow bezel of a LCD according to the second embodiment of the present invention
Figure 6:
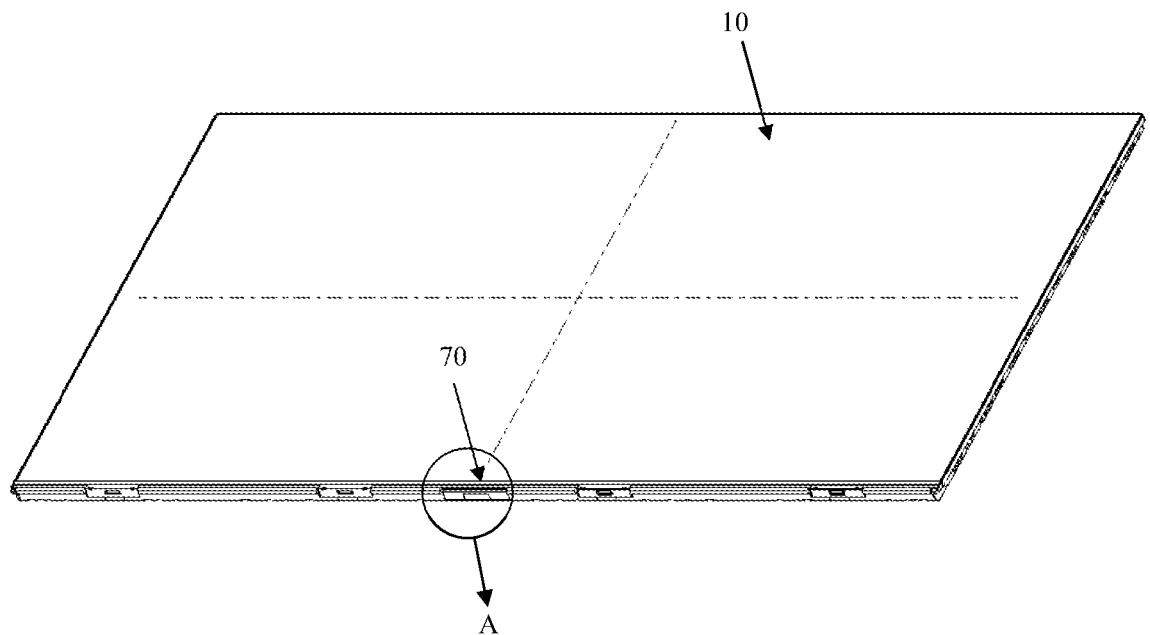
FIG. 6 is a schematic diagram showing an assembly of a locking member and a liquid crystal module according to the second embodiment of the present invention.
Figure 7:
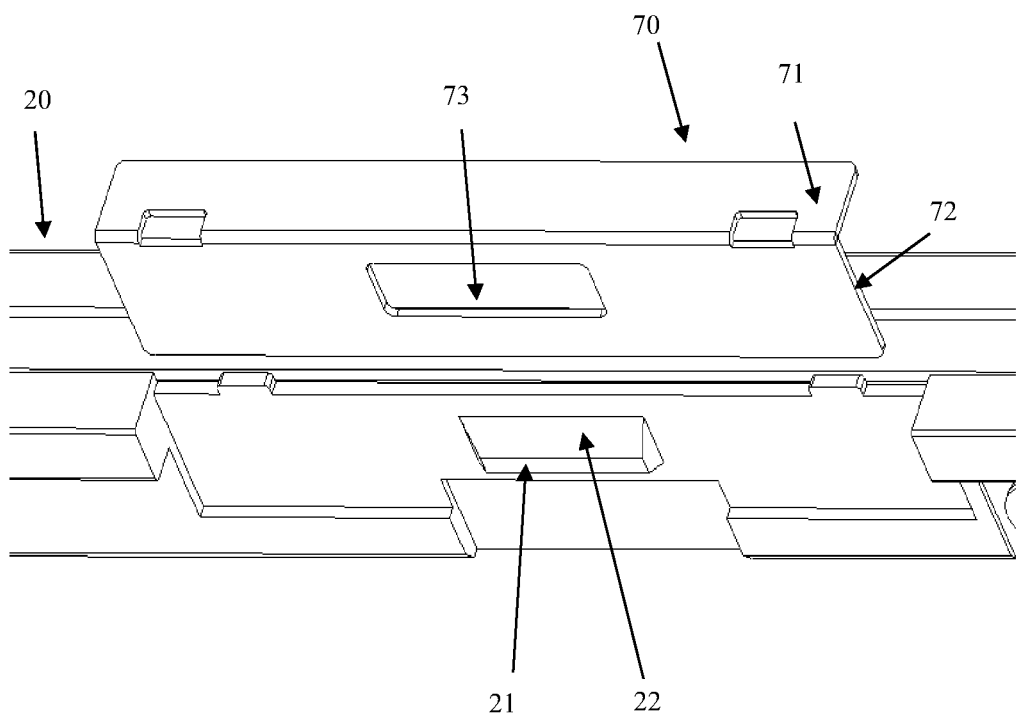
FIG. 7 is an enlarged view of portion A depicted in FIG. 6.

Please refer to FIG. 5, FIG. 6, and FIG. 7, locking members 70 are utilized to enhance the fixed effect of the liquid crystal module 10 according to the present embodiment. A number of locking members 70 distributed in the liquid crystal module 10 are used for holding the liquid crystal module 10. The locking member 70 comprises a horizontal part 71 and a perpendicular part 72 perpendicularly connected to the horizontal part 71. The horizontal part 71 presses an upper surface 12 of a bottom glass substrate in an outer lead bonding (OLB) area of the liquid crystal module 10. The perpendicular part 72 and the middle cover 20 are connected by a snap-fit assembly correspondingly disposed on them. A thickness of the horizontal part 71 must not exceed a thickness of a top glass substrate 14 of the liquid crystal module 10. A buffer material layer 13 is optionally attached to a bottom surface of the horizontal part 71. The snap-fit assembly comprises an undercut 73 disposed in the perpendicular part 72 of the locking member 70 and a protrusion portion 21 disposed on the middle cover 20. An upper portion of the protrusion portion 21 corresponding to the snapping direction of the perpendicular part 72 is shaped in a slope.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A narrow bezel structure of a liquid crystal display comprising a liquid crystal module, a front cover, a middle cover, and a back cover, an external layer of the liquid crystal module being a polarizer film, the polarizer film being spaced apart from an edge of the liquid crystal module to form a step;

the narrow bezel structure further comprising a number of locking members used for holding the liquid crystal module, the locking member comprising a horizontal part and a perpendicular part perpendicularly connected to the horizontal part;

wherein the front cover comprises a first horizontal part, a first perpendicular part, a second horizontal part, and a second perpendicular part which are integrally formed and sequentially connected, the first horizontal part is attached to the step, the second horizontal part and the second perpendicular part form a second step, and the second perpendicular part is fixedly connected to the back cover, and wherein the horizontal part presses an upper surface of a bottom glass substrate in an outer lead bonding area of the liquid crystal module, and the perpendicular part and the middle cover are connected by a screw correspondingly disposed on the perpendicular part and the middle cover.

2. The narrow bezel structure of the liquid crystal display as claimed in claim 1, wherein a bottom of the first horizontal part is stuck to the liquid crystal module through a double-sided tape, and one end of the first horizontal part and one end of the polarizer film are butt jointed.

3. The narrow bezel structure of the liquid crystal display as claimed in claim 2, wherein the one end of the first horizontal part and the one end of the polarizer film are butt jointed outside the view area of the liquid crystal module.

4. The narrow bezel structure of the liquid crystal display as claimed in claim 3, wherein a thickness of the front cover is between 0.2 mm and 0.3 mm.

5. The narrow bezel structure of the liquid crystal display as claimed in claim 4, wherein the front cover is made of sheet metal.

6. The narrow bezel structure of the liquid crystal display as claimed in claim 1, further comprising an outer side cover attached to the second step.

7. The narrow bezel structure of the liquid crystal display as claimed in claim 6, wherein an outer surface of the outer side cover and the first perpendicular part are on the same plane.

8. The narrow bezel structure of the liquid crystal display as claimed in claim 1, wherein the second perpendicular part is fixedly connected to the back cover by way of screw tightening.

9. A liquid crystal display comprising a liquid crystal module, a backlight module, a front cover, a middle cover, a back cover and a narrow bezel structure, wherein an external layer of the liquid crystal module is a polarizer film, the polarizer film is spaced apart from an edge of the liquid crystal module to form a step, the front cover comprises a first horizontal part, a first perpendicular part, a second horizontal part, and a second perpendicular part which are integrally formed and sequentially connected, the first horizontal part is attached to the step, the second horizontal part and the second perpendicular part form a second step, and the second perpendicular part is fixedly connected to the back cover, wherein an outer surface of the outer side cover and the first perpendicular part are on the same plane.

10. The liquid crystal display as claimed in claim 9, wherein a bottom of the first horizontal part is stuck to the liquid crystal module through a double-sided tape, and one end of the first horizontal part and one end of the polarizer film are butt jointed.

11. The liquid crystal display as claimed in claim 9, wherein the one end of the first horizontal part and the one end of the polarizer film are butt jointed outside the view area of the liquid crystal module.

12. The liquid crystal display as claimed in claim 9, wherein a thickness of the front cover is between 0.2 mm and 0.3 mm.

13. The liquid crystal display as claimed in claim 9, further comprising an outer side cover attached to the second step.

14. The liquid crystal display as claimed in claim 9, wherein the second perpendicular part is fixedly connected to the back cover by way of screw tightening.

\* \* \* \* \*